United States Patent
Fan et al.

(10) Patent No.: US 11,841,915 B2
(45) Date of Patent: Dec. 12, 2023

(54) SYSTEMS AND METHODS FOR DISPLAYING CONTEXTUALLY RELEVANT LINKS

(71) Applicant: MicroStrategy Incorporated, Tysons Corner, VA (US)

(72) Inventors: Siyuan Fan, Falls Church, VA (US); Jiande Yu, McLean, VA (US); Fang Niu, Fairfax, VA (US); Victor Hugo Pena, Falls Church, VA (US); Jose Manuel Nocedal De La Garza, Leesburg, VA (US); Raul De Leon, Vienna, VA (US)

(73) Assignee: MICROSTRATEGY INCORPORATED, Tysons Corner (VA)

( * ) Notice: Subject to any disclaimer, the term of this patent is extended or adjusted under 35 U.S.C. 154(b) by 8 days.

(21) Appl. No.: 16/804,644

(22) Filed: Feb. 28, 2020

(65) Prior Publication Data

US 2021/0271727 A1 Sep. 2, 2021

(51) Int. Cl.
| | |
|---|---|
| G06F 16/00 | (2019.01) |
| G06F 16/955 | (2019.01) |
| H04L 67/02 | (2022.01) |
| G06F 16/9538 | (2019.01) |
| G06F 16/958 | (2019.01) |
| G06F 16/9535 | (2019.01) |

(52) U.S. Cl.
CPC ........ *G06F 16/9558* (2019.01); *G06F 16/958* (2019.01); *G06F 16/9535* (2019.01); *G06F 16/9538* (2019.01); *H04L 67/02* (2013.01)

(58) Field of Classification Search
CPC ............. G06F 16/9558; G06F 16/9535; G06F 16/958; G06F 16/9538; H04L 67/02
USPC .................................................. 707/600–899
See application file for complete search history.

(56) References Cited

U.S. PATENT DOCUMENTS

| | | | | |
|---|---|---|---|---|
| 2010/0138271 A1* | 6/2010 | Henkin | .............. | G06Q 30/0256 705/14.54 |
| 2014/0180672 A1* | 6/2014 | Mo | ..................... | G06F 16/3344 704/9 |
| 2015/0006564 A1* | 1/2015 | Tomkins | ............. | G06F 16/9535 707/767 |

(Continued)

*Primary Examiner* — Irete F Ehichioya
*Assistant Examiner* — Shirley D Hicks
(74) *Attorney, Agent, or Firm* — Bookoff McAndrews, PLLC

(57) ABSTRACT

Disclosed are methods, systems, and computer-readable medium for displaying contextually relevant links by a browser extension. For instance, the method may include: comparing terms of a set of terms with a content of a user interface to identify matching terms; in response to identifying matching terms, transmitting a query to a server, the query indicating the matching terms; receiving a response from the server, the response including one or more information cards for each of the matching terms; annotating instances of the identified matching terms on the user interface; in response to a user interaction with an annotated instance of an identified matching term, causing an information card to be displayed that corresponds to the identified matching term, the information card including a link element; determining whether a user input selects the link element; and in response to determining the user input selecting the link element, executing a link process.

21 Claims, 12 Drawing Sheets

(56) References Cited

U.S. PATENT DOCUMENTS

2015/0189347 A1\* 7/2015 Oztaskent .......... H04N 21/4722
725/32

\* cited by examiner

SYSTEMS AND METHODS FOR DISPLAYING CONTEXTUALLY RELEVANT LINKS

TECHNICAL FIELD

Various embodiments of the present disclosure relate generally to systems and methods for displaying contextually relevant links and, more particularly, to systems and methods for displaying contextually relevant links by a browser extension.

BACKGROUND

The present specification relates to inline delivery of database content.

The present disclosure is directed to overcoming one or more of these above-referenced challenges.

SUMMARY OF THE DISCLOSURE

According to certain aspects of the disclosure, systems, methods, and computer-readable medium are disclosed for displaying contextually relevant links by a browser extension. For instance, a method may include: receiving and examining content of a user interface of a browser on a recurring or ongoing basis; comparing terms of a set of terms with the content of the user interface to identify matching terms; in response to identifying matching terms, transmitting a query to a server, the query indicating the matching terms; receiving a response from the server, the response including one or more information cards for each of the matching terms; annotating instances of the identified matching terms on the user interface; in response to a user interaction with an annotated instance of an identified matching term, causing an information card to be displayed that corresponds to the identified matching term, the information card including a link element; determining whether a user input selects the link element; and in response to determining the user input selecting the link element, executing a link process.

A system may include at least one memory storing instructions; and at least one processor executing the instructions to perform operations. The operations may include: receiving and examining content of a user interface of a browser on a recurring or ongoing basis; comparing terms of a set of terms with the content of the user interface to identify matching terms; in response to identifying matching terms, transmitting a query to a server, the query indicating the matching terms; receiving a response from the server, the response including one or more information cards for each of the matching terms; annotating instances of the identified matching terms on the user interface; in response to a user interaction with an annotated instance of an identified matching term, causing an information card to be displayed that corresponds to the identified matching term, the information card including a link element; determining whether a user input selects the link element; and in response to determining the user input selecting the link element, executing a link process.

A non-transitory computer-readable medium may store instructions that, when executed by a processor, cause the processor to perform operations. The operations may include: receiving and examining content of a user interface of a browser on a recurring or ongoing basis; comparing terms of a set of terms with the content of the user interface to identify matching terms; in response to identifying matching terms, transmitting a query to a server, the query indicating the matching terms; receiving a response from the server, the response including one or more information cards for each of the matching terms; annotating instances of the identified matching terms on the user interface; in response to a user interaction with an annotated instance of an identified matching term, causing an information card to be displayed that corresponds to the identified matching term, the information card including a link element; determining whether a user input selects the link element; and in response to determining the user input selecting the link element, executing a link process.

In some implementations, a computing system can identify keywords in a user interface and dynamically retrieve and present relevant information inline with the user interface. For example, a client device can run a software agent, such as a web browser extension, that monitors a user interface for instances of certain keywords. When the keywords are present, the software agent annotates the keywords and makes them interactive in the user interface. If a user interacts with a keyword, for example, by placing a cursor over the keyword, the software agent causes an information card to be displayed, e.g., overlaying a portion of the original user interface or otherwise inserted into the user interface. In this manner, the user can easily access information that is contextually relevant to the user interface, without the need to open a new application or switch between interfaces. This technique also provides numerous other advantages, discussed below, such as allowing content to be efficiently integrated with third-party user interfaces that the content provider does not control.

The system allows for significant customizability. These keywords monitored by the software agent can be specific to a user or the user's organization. For example, when the user is an employee of a company, the keywords of interest can be extracted from a private database for the company. The keywords can additionally or alternatively be selected or filtered to terms applicable to the specific user, e.g., terms relevant to the user's role in the company. When one of the keywords is determined to be present in the user interface, the software agent communicates with a server system to obtain information related to the keyword. This information can include data retrieved from a private database that has information specific to an organization associated with the user. For example, if the keyword refers to a customer of a user's company, status information, statistics, contact information, and other information about the customer's account with the company can be provided from the company's private database.

The type of information provided, as well as the values shown for those information types, can be customized for the user and organization. For example, a sales representative and a product engineer at the same company may be shown different types of information for the same keyword, due to their different roles. Similarly, two users in a company with the same role might be shown different information for the same keyword, due to the users having different types of previous interactions with the system. In general, the system can use machine learning techniques to predictively select which information to show to a particular user at a particular time for a given keyword, and how to organize the information.

In many conventional systems, user interfaces have a predetermined structure or layout designed to accommodate the content displayed. To add a new frame or region of the interface, the structure of each user interface to be updated usually must be changed one by one. For example, to provide embedded content in a web page or web application, the user interface is often designed to include an iFrame or other element for the embedded content. Native applications also generally have predefined user interface layouts. This often makes it difficult to add or alter embedded content regions in user interfaces because the source code, HTML code, or other data defining each user interface needs to be individually changed. For example, it may be desirable to provide a new embedded content region in each of many different pages of a web site or web application, but doing so may require changes to each of the pages individually.

Embedding content is also challenging because the party desiring to embed the content may not control or have the ability to change the underlying user interface. For example, one company may have content to be embedded in an application provided by a different company. The content provider would need to rely on the application provider to modify the structure of the application, one page at a time, in order to have the content embedded. For example, it is often difficult for a company to integrate content from its proprietary database into a user interface provided by a third party, e.g., an e-mail application, a word processing application, a spreadsheet application, etc., because the company generally cannot change the structure of the user interface provided by the third-party.

The challenge of embedding content in user interfaces is also significant since the embedded content may be needed only selectively. For example, it may be desirable to embed content on some pages but not others. Similarly, the embedded content may only be applicable for a page at certain times and not others. The need for the embedded content may vary over time, and may be dependent on factors such as the context provided by other content in the page, which may also vary over time. As a result of these factors and others, simply adjusting a general template for many pages cannot perform the fine-grained integration of embedded content, since the decisions whether to embed content and what content to embed is often a page-specific decision that changes over time.

The techniques discussed in this document address these challenges by allowing content to be presented inline with web pages and applications that the content provider does not control and cannot modify. Similarly, the system can be configured to provide content inline with other content that has not been created yet, such as web pages or web applications that are not yet available.

The techniques in this document also provide an efficient way for users to access information, such as analytics data, in a user interface. By allowing a user to call up an information card within existing user interface, the user no longer needs to switch applications and lose the context of the applications involved in the user's current task.

Traditionally, if a user is performing a task with an application and desires to look up information from an analytics platform or other database-backed platform, the user generally needs to switch applications or windows, log in, submit a query for the information desired, then wait for results to be returned. The delays, multiple steps required, and overall inconvenience often discourage users from looking up needed information.

By contrast, the techniques in the present application do not require the user to switch applications or interfaces, and contextually-relevant information is provided in the interface where the user needs the information. This provides needed information to just the right user, time, and user interface where the information is needed. Delays are minimal because the client device can request and receive contents of the information cards before the user indicates that the information should be displayed. The software agent on a client device can evaluate contents of the user interface, generate a query for a server system, and receive and format results for display so the information cards for each of multiple different terms are available for display before the user indicates the terms of interest. Also, the user can call up the information with a single action on the existing interface, such as a mouseover, click, or tap on an annotated term in the user interface.

Limited user interface space is conserved since the information card can be provided in the same window or area of the application the user is already using, with no need to switch between applications. Also, the information card is displayed and removed dynamically, so it is shown only when the user requests it. Unlike interfaces that include a dedicated, persistent area for content that may not be needed at most times, the present technique frees up more of the interface for use by an application.

The techniques discussed below also provide an efficient way to publish customized or private database content to users. The keywords or terms of interest to each organization can be set based on the private database contents for the organization. For example, each organization can have its own set of customers, employees, suppliers, product names, and so on reflected in its private database. Based on the database contents, terms have a semantic meaning that is specific to that organization, which the system uses to tailor the display of information for members of the organization.

In some implementations, the system provides an interface for an administrator to easily adjust the sets of terms that the system will highlight and make interactive for members of the organization by updating the database or identifying certain portions of a dataset. For example, an administrator can identify columns of a private database corresponding to employee names, customer names, and product names. The system extracts the contents of these columns and designates them as key terms for the organization. The current set of these terms can be downloaded to client devices of members of the organization when they authenticate to the software agents on the client devices, so each time the user authenticates the set of terms is refreshed at the client device based on the current state of the database. Alternatively, the current set of these terms may auto-refresh so that the client constantly may monitor if the data in the private database changes so that the client may annotate new terms on web pages. The information displayed in the information cards is also generated using the current records of the database. Thus, by designating certain records or fields from an organization's database, an administrator can adjust or update the set of content published to some or all members of the organization, which will be made available through many user interfaces (e.g., presented inline with any web page or web application).

When a client device indicates that one of the key terms for the organization is present, the server system can access the underlying database record(s) corresponding to the term to generate relevant information to provide. The semantic meaning of the term that is applicable for the user and organization is used to provide customized results. For example, different types of information are provided based on the classification of the term, e.g., whether a term is the name of an employee, customer, or product. Different semantic classifications can have different data types or sets of information to be provided. Even for a particular classification, of the many potential types of data that may be provided, a subset can be selected based on analysis of the database contents (e.g., to identify trends or items that are popular, recent, or unusual according to various thresholds), relevance to the user (e.g., applicability to the user's historical behavior or role in the organization), and/or context (e.g., other keywords in the user interface, which may indicate geographical location, time, individuals, or other information relevant to the user's current task). In this process, the organizations security policies are preserved. If a user does not have authorization to access a field or record from the database, the server system will enforce access restrictions and will not provide the information. Consequently, different users even within the same organization may be presented different sets of information for the same term, due to the users' differing roles, interaction histories, access authorizations, and other factors.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 4A-4E depict exemplary graphical user interfaces (GUIs) for authoring an information card that includes at least one link for a link display process, according to one or more embodiments.

FIGS. 5A-5B depict graphical user interfaces (GUIs) for displaying an information card that includes a link for a link display process, according to one or more embodiments.

DETAILED DESCRIPTION OF EMBODIMENTS

Various embodiments of the present disclosure relate generally to systems and methods for displaying contextually relevant links.

In general, the present disclosure is directed to system and methods for displaying contextually relevant links by a browser extension. For instance, a browser extension of the present disclosure may: compare terms of a set of terms with content of a user interface of a browser to identify matching terms; in response to identifying matching terms, transmit a query to a server, the query indicating the matching terms; and receive a response from the server, the response including one or more information cards for each of the matching terms. The browser may, when displaying an information card, display a link element so that a user may quickly access contextually relevant information. The link element may be dynamically generated by the server so that the information cards can be dynamically generated and reference different entities and/or pass different parameters to URLs. Therefore, the browser extension of the present disclosure may allow users to quickly and easily find relevant information, without having to navigate multiple web pages, web applications, or other applications of the client device.

Figure 1:
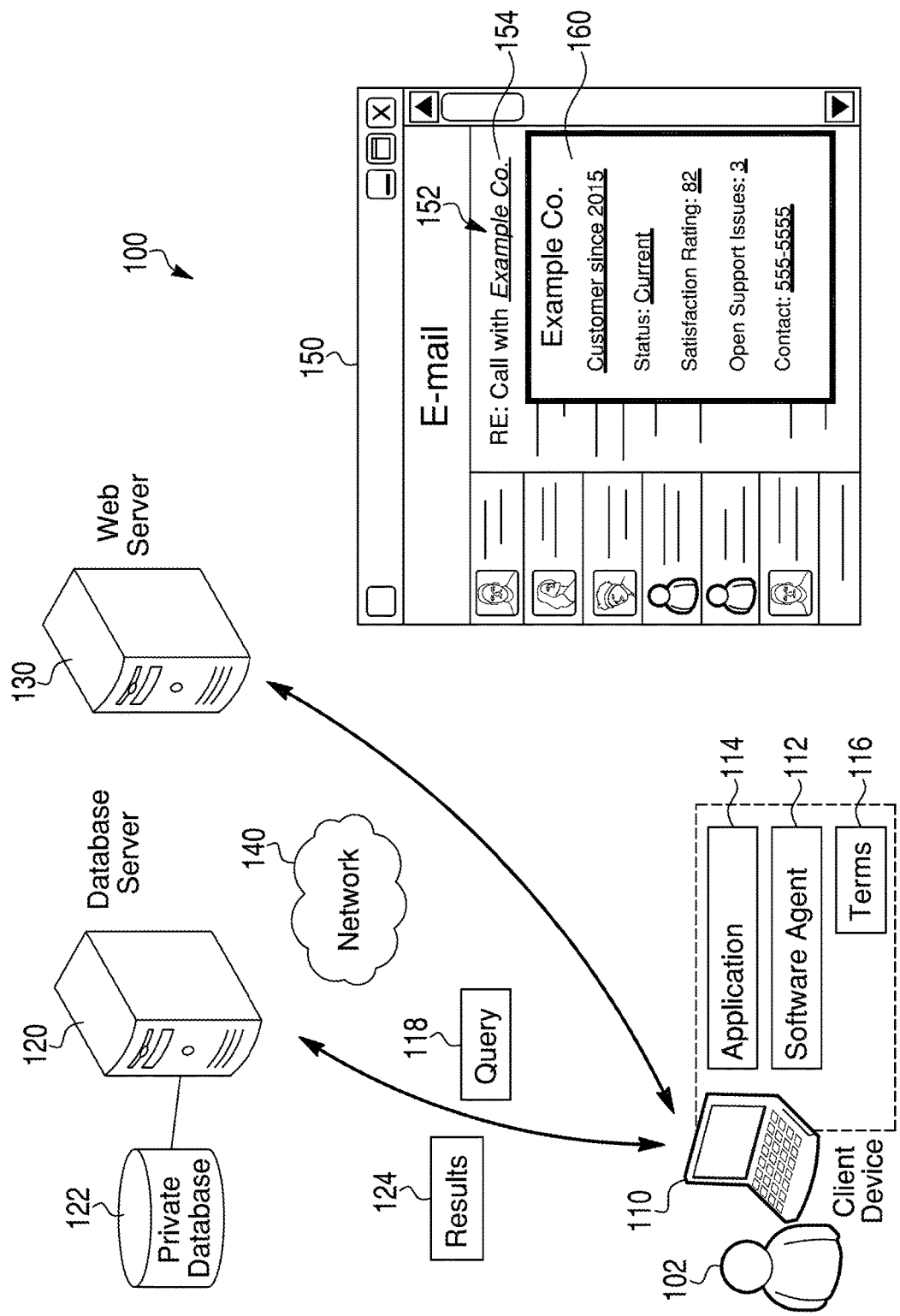
FIG. 1 depicts a system diagram for inline delivery of database content, according to one or more embodiments.

As shown in FIG. 1, FIG. 1 depicts a system diagram for inline delivery of database content, according to one or more embodiments. The system 100 may include a client device 110, a server 120, a web server 130, and a network 140. The server 120 may have access to a private database 122 for an organization. The server 120 may be implemented using multiple computers that cooperate to perform the functions discussed below, and which may be located remotely from each other. The client device 110 may include an application 114 as well as a software agent 112. The software agent 112 may enable the client device 110 to dynamically generate and display contextually-relevant information cards displayed inline with the application 114. As discussed below, the software agent 112 may allow the client device 110 to obtain and provide information from the private database 122 with the application 114 and web page from the web server 130, even though the application 114 and web page are controlled by third parties.

The client device 110 may be associated with a user 102, who is a member of an organization, e.g., an employee of a company. The private database 122 may represent database records stored by or for the organization. The records may not be publicly available and may be subject to data access restrictions, such as requirements that users be issued credentials from the organization that grant authorization to access the records. Different users may be granted different levels of authorization, and the server 120 may enforce access restrictions so that each user is only allowed to access the subsets of information the user is authorized to access.

Traditional analytics platforms generally incorporate analytics content into the body of a document, using an iFrame or similar technique. This approach may be inefficient, because each application or web page generally needs to be updated individually. Further, this type of embedding may not be possible when the content provider does not control the target application or web page for content to be embedded into. For example, an organization may not change the standard e-mail application interface that a third party provides.

In the system 100, instead of incorporating additional content into the source of a document or application, information may be instead added, just in time, through the software agent 112, for example, a browser extension for a web browser. This may provide the flexibility for the system to selectively provide dynamically changing content from the private database 122 for any interface shown on the application 114, e.g., any web application or web page displayed by a web browser.

In the example of FIG. 1, the client device 110 may communicate with the web server 130 to obtain and display a page of a web site or web application in the application 114. The client device 110 may generate a user interface 150 for the application 114. Concurrently, the software agent 112 may run on the client device 110 and receive, from the application 114, the text content of the rendered page, e.g., user interface 150.

The software agent 112 may require the user 102 to authenticate and thus prove authorization to receive content from the private database 122. The authentication of the user 102 may also indicate to the software agent 112 and/or server 120 the role of the user in the organization (e.g., software engineer, marketing technician, financial analyst, and so on) and the specific level of access authorization that has been granted to the user 102 by the organization.

With the user logged in, the software agent 112 may access a set of terms 116, e.g., words and/or phrases, that are relevant to the user 102 and the organization. The set of terms 116 may be stored at the client device 110. In some implementations, the set of terms 116 is requested and received from the server 120 each time the user 102 authenticates. The set of terms 116 may represent values from certain fields of the private database 122, for example, values representing names of customers, providers, employees, etc. of the company of the user 102.

The software agent 112 may compare terms of the set of terms 116 with the text of the user interface 150 to identify matching terms (referred to as "trigger condition" herein). When the software agent 112 identifies one or more matches, the software agent 112 may generate a query 118. The query 118 may indicate the matches and the software agent 112 may transmit the query 118 to the server 120. In some implementations, the software agent 112 may examine the text of the user interface 150 to identify and include in the query 118 other contextual factors that may be of interest (which may be different from the terms 116 of interest), such as terms indicating a time or a geographical location indicated in the user interface 150, or a task of the user 102 that may be indicated in the user interface 150. Various words and phrases indicating an overall subject or topic of the user interface 150 may also be extracted and provided in the query 118.

The server 120 may process the query 118 and generate results 124 using the contents of the private database 122. These results 124 may indicate, for each identified matching term, various indicators (e.g., attributes, statistics, visualizations, text, or other content) relevant to the term. In some instances, the indicators may represent key performance indicators for an entity referred to by an identified term with respect to the specific organization of the user 102. For example, when the term refers to a customer of a company of the user 102, one of the indicators may specify a product of the company that was purchased by the customer, current or forecasted sales of the company to the customer, etc.

For instance, in FIG. 1, information cards may be presented on the client device 110 as electronic cards that comprise information obtained from the private database 122, such as the indicators discussed above. The cards may include dynamically generated information so that they reflect changes to data stored in the private database 122. For example, the server 120 may store card templates that identify the format and structure of the cards. The specific information that is displayed in the cards may be dynamically populated into the templates as the server 120 generates the results 124, so that each display of a card may include information generated from up-to-date information from the private database 122. Thus, if the same card for the same entity is displayed at different times, the content may be different for each instance of the card as the information in the private database 122 changes.

The card templates may include different templates for different types of entities. For example, one template may be used for a person, another template may be used for a company, another template may be used for a location (e.g., a particular store or region), and so on. Different card templates may also be defined and used for entities having different semantic relationships with the user 102, the user's organization, or others. For example, a first template may be used for companies that are customers, and may specify a first set of statistical measures to display in a card. A second template for suppliers may specify a different set of statistical measures to display in a card.

Briefly, in the example of FIG. 1, the software agent 112 on the client device 110 may detect a matching tem, such as a term of the set of terms 116, in the text of the user interface 150. The software agent 112 may then generate the query 118 and transmit the query 118 to the server 120. The server 120 may then generate the results 124 based on the query 118, which may include one or more information cards. For instance, the server 120 may select an appropriate card template, generate an information card based on the card template and data in the private database 122, and send data for the information card back to the client device 110 for display.

For instance, the client device 110 may receive the results 124 from the server 120. The software agent 112 may annotate instances of the identified matching terms in the user interface and prepare the results 124 for display. For example, to annotate the matching terms, the software agent 112 may instruct the application 114 to highlight the term or otherwise change the formatting of the term (e.g., color, font, size, bold, italics, underlining, etc.) in the user interface 150. In some implementations, the results 124 may not immediately be displayed. Rather, the software agent 112 may cause the matching terms to become interactive, so that interaction of the user with a term triggers display of a corresponding information card for that term. In this manner, when a user indicates interest in one of the terms, e.g., by placing a mouse cursor over the term, the software agent 112 may be notified of the interaction and cause an information card with the indicators relevant to the term to be displayed. The information card may be displayed overlaying a portion of the original user interface 150, for example, as a pop-up panel near the instance of the term that the user interacted with. The software agent 112 may also detect when the user 102 is no longer interested in the information card and automatically remove (e.g., close or hide) the information card from the user interface 150 in response. For example, when the user moves the cursor away from the interactive term and/or away from the information card (or taps or clicks outside the interactive term and/or information card), the software agent 112 may remove the information card from the user interface 150.

In FIG. 1, the software agent 112 may have determined that the user interface 150 includes a term 152 "Example Co.," which is one of the set of terms 116 relevant to the organization of the user 102. The software agent 112 may have received the results 124 that indicate indicators for this term 152, which represents a customer of the organization of the user 102. In response to identifying the matching term 152, and in some instances also receiving the results 124 from the server 120 for the matching term 152, the software agent 112 may make the term 152 interactive and cause the term 152 to be annotated, in this case, displayed bold, underlined, and in italics. Initially, the software agent 112 may not cause any of the indicators for the term 152 to be displayed. However, when the user moves the cursor 154 over the term 152, the software agent 112 may detect the interaction and display an information card 160 showing various indicators provided by the server 120 in the results 124. When the user 102 is done reviewing the information card 160, the user 102 may move the cursor away or click away from the term 152 and/or information card 160, and the software agent 112 may automatically hide the information card 160 until the user 102 again interacts with the term 152.

The software agent 112 may receive and examine the content of the user interface 150 of the application 114 on a recurring or ongoing basis. For example, as the user 102 navigates to a new web page or a new view of a web application, the software agent 112 may examine the updated content of the user interface 150. The software agent 112 may find matches in the updated interface, request and obtain new results 124 for the updated interface from the server 120, and cause new sets of terms to be annotated and made interactive, allowing the user 102 to access information cards for key terms for whatever interface content may be provided in the application 114. The software agent 112 may receive and analyze user interface content in substantially real time. For example, if the user 102 composes an e-mail message, the software agent may detect matching terms in text that the user types, in some instances while the user is still typing, and annotate matching terms in this content.

The system may provide very low latency for users to receive information regarding key terms in a user interface. Because the software agent 112 may identify terms and obtain terms automatically and in the background, in many instances the information needed for an information card 160 is already present at the client device 110 before the term is annotated. Consequently, when the user interacts with an annotated term, the corresponding information card 160 may be displayed very quickly, often within a second or less. This may provide users a very fast response while also allowing access to the information from the private database 122 without having to leave the user interface 150 of the application 114.

Figure 2A:
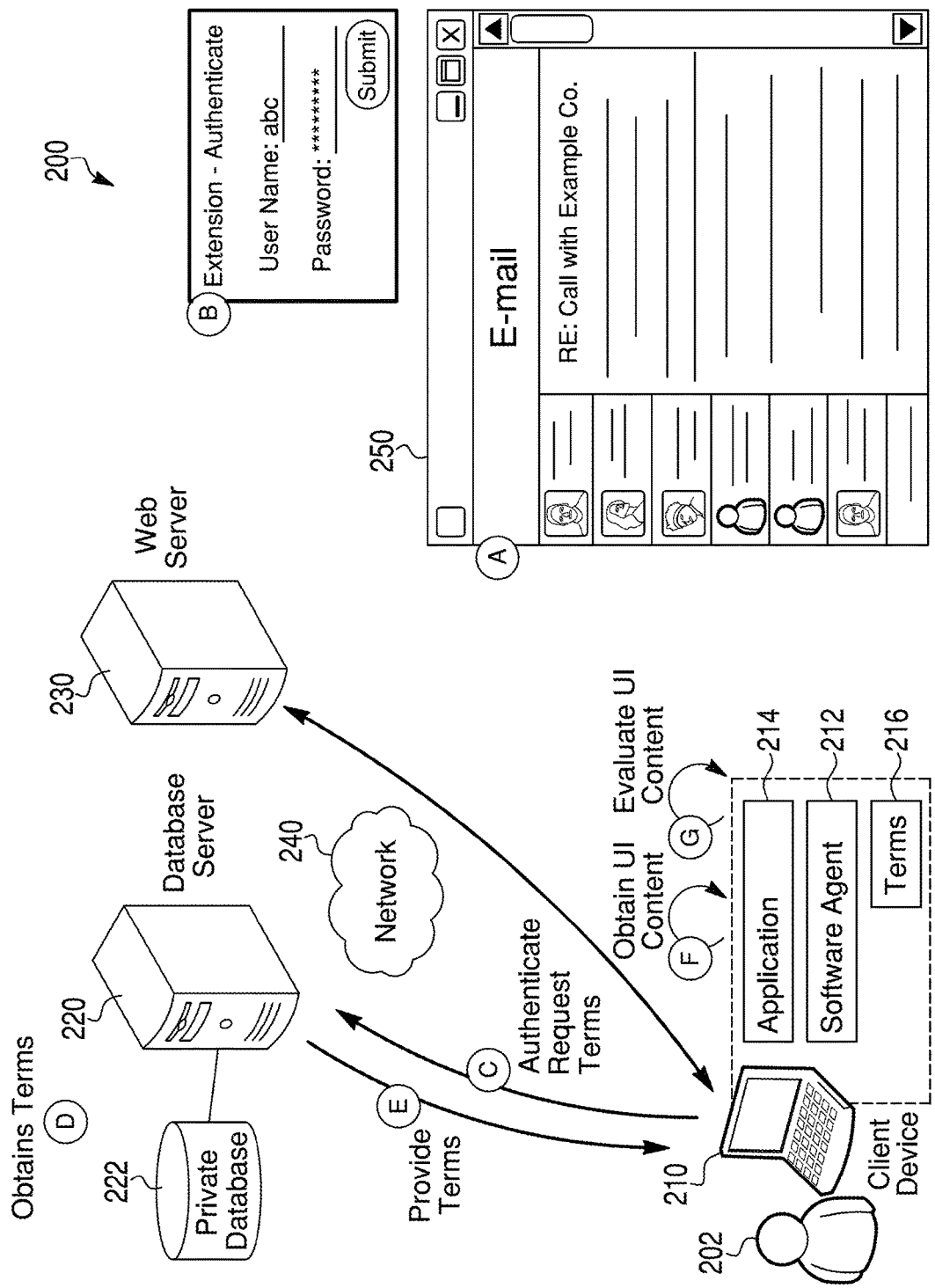
FIGS. 2A-2B depict system diagrams illustrating for inline delivery of database content, according to one or more embodiments.
Figure 2B:
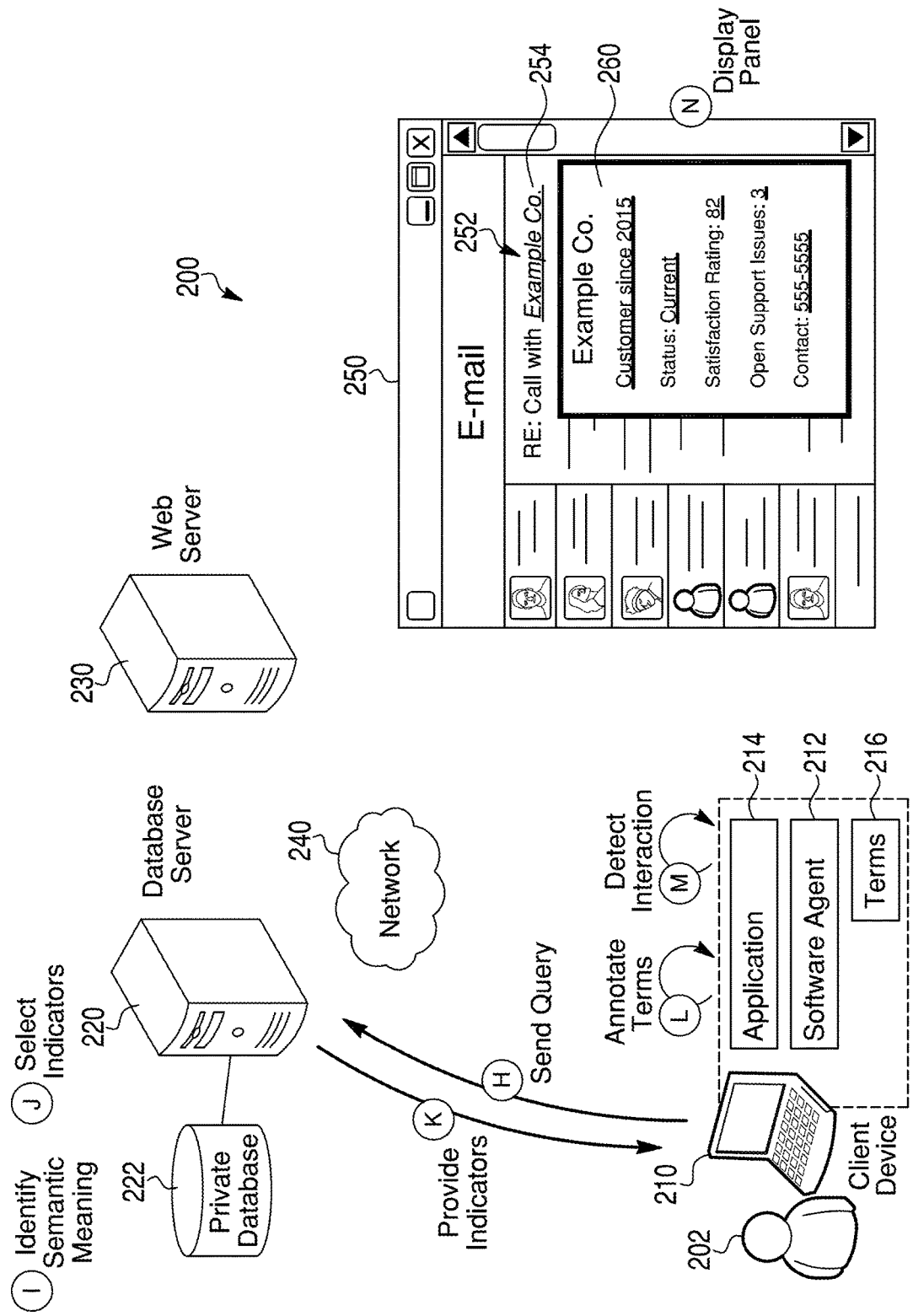

FIGS. 2A-2B depict system diagrams illustrating for inline delivery of database content, according to one or more embodiments. For instance, FIGS. 2A-2B may illustrate various operations of the system 100 in greater detail. FIGS. 2A-2B illustrate various operations and flows of data represented as stages (A)-(N), which can be performed in the order shown or in a different order.

The system 200 may include a client device 210, a server 220, a web server 230, and a network 240. The server 220 may have access to a private database 222 for an organization. The server 220 may be implemented using multiple computers that cooperate to perform the functions discussed below, and which may be located remotely from each other. The client device 212 may include an application 214 as well as a software agent 212 that enables the client device 210 to dynamically generate and display contextually-relevant information cards displayed inline with the application 214. As discussed below, the software agent 212 may allow the client device 210 to obtain and provide information from the private database 222 with the application 214 and web page from the web server 230, even though the application 214 and web page are controlled by third parties.

In stage (A), the client device 210 may obtain and display content from the web server 230 in user interface 250.

In stage (B), the user 202 may authenticate to the software agent 212, e.g., a web browser extension or add-on for another type of application 114. For example, the software agent 212 may prompt the user 202 to log in, or the user may click an icon for the software agent 212 to initiate log in. The user may enter a username and password, or alternatively authenticate in another form, e.g., through biometric data entry, entry of a PIN code, etc.

In stage (C), the software agent 212 may communicate with the server 220 to authenticate the user 202. The software agent 212 may optionally request updated information from the server 220, such as a set of terms 216 representing keywords relevant to the user 202 and an organization of the user 202.

In stage (D), the server 220 may complete the authentication of the user 202. Once it is determined that the received credentials are valid and authorize access to information from the private database 222, the server 220 may obtain the current set of terms or keywords that are applicable for the user 202 and the user's organization. This may involve extracting information from the private database 222, for example, extracting values from certain columns or fields of the database, such as extracting values representing names of entities or objects. Terms may additionally or alternatively be extracted based on having certain metadata tags or data types associated with them. Other terms, such as abbreviations, nicknames, and other identifiers may also be included. The terms may be filtered based on the access permissions of the user 202, the role of the user 202 (e.g., department, job title, responsibilities, etc.), and other factors.

In stage (E), the server 220 may provide the terms to the client device 110 for storage and for use by the software agent 212.

In stage (F), the software agent 212 may obtain user interface content from the application 214. For example, the software application 212 may obtain text content from the user interface 250. This can include the entire content of the rendered page, document, or view, not only the portion that may be currently visible on screen (e.g., due to the current scrolling position).

In stage (G), the software agent 212 may evaluate content of the user interface. For example, this may include comparing text from the user interface 250 with the terms 216 provided by the server 220 and stored at the client device 210, to identify matching terms that should be annotated and for which information cards may be generated.

In some implementations, the software agent 212 and/or the database server 220 may analyze text of the user interface 250 to identify or generate indicators to be displayed, so that the card templates may be dynamically populated with indicators. Through analysis of the text of the user interface 250, the software agent 212 and/or the database server 220 may, in real-time, produce indicators and other information on the fly, without the indicators being previously designed by a human author or administrator. For example, if the software agent detects there are multiple instance of an attribute combined with time and geographical dimensions, through interactions with the server 220, the software agent may produce specific aggregations of data for the indicated time and geography and present the information in an information card. To carry out this function, the server 220 may access a semantic graph to enable interpretation of content as it relates to a business or other entity, provide a summary, and link to more details, all of which can be produced dynamically. The semantic graph may indicate, for example, the attributes of an entity and may indicate where to locate data for the attributes from the private database 222.

As an example, from text in a web page, the software agent 212 may identify words in various semantic categories. As an example, along with a keyword "Example Co.," the extension may identify the terms "Q2," "Florida," "subscribers," and "2016" which are not keywords corresponding to specific entities of interest, but nonetheless have a semantic meaning identified by the software agent 212. From these additional terms, the software agent may compose one or more indicators to be requested from the database server 220. For example, the software agent 212 may generate a query that requests a number of subscribers from Example Co. were added in Florida from April to June of 2016. Similarly, the software agent 212 may generate a query requesting a total number of subscribers from the company for the same period and location. In addition, or as an alternative, the software agent 212 may provide the terms with semantic meanings to the database server 220, and the database server 220 may identify appropriate indicators from the terms.

Referring to FIG. 2B, in stage (H), the software agent 212 may generate a query that indicates which terms 216 were identified in the user interface 250. The query may additionally include other contextual information, such as indications of time, geographical location, or topic that the software agent 212 identified in the content from the user interface 250. The software agent 212 may cause the client device 210 to send the query to the server 220.

In stage (I), the server 220 may identify a semantic meaning for each identified term that the query indicates. As part of identifying a semantic meaning, the server 220 may select a semantic classification from among multiple predetermined semantic categories. The semantic meaning may be generated using the information of the private database 222 and so can be specific to the user 202 and the organization of the user. For example, one company may be a supplier for one organization and a customer of another. Similarly, even within one organization, an individual may be the supervisor of one user but a peer of or may be supervised by a different user. Thus, the interpretation of the terms can vary based on the relationships indicated in the private database 222 and can vary from one organization to another, from one user to another, and over the course of time.

In stage (J), the server 220 may select indicators for each identified match to the terms 216. The server 220 may also look up or calculate values for each type of indicator selected.

As noted above, for each matching term, the server 220 may determine a semantic classification of the term, e.g., a category or classification of the term and/or identifying an entity that the term refers to (e.g., where the entity may be a particular person, company, object, etc.). The server 220 may also access one or more records from the private database 222. The types of records accessed may vary based on the semantic classification. For example, when the term is a customer name, the data may indicate indicating attributes of the customer (e.g., size, geographical presence, industry, etc.), financial records for the customer (e.g., products purchased, historical and predicted sales amounts, etc.), contact information for representatives of the customer, and so on. When the term is determined to refer to an employee, the accessed records may indicate the department of the employee, the responsibilities of the employee, the supervisor of the employee, the length of time the employee has been with the company, and so on.

For each semantic category, the server 220 may have a number of potential indicators or types of data that may be provided. These indicators may take any appropriate form, such as text, numbers, icons, charts, graphs, images, etc. In some instances, the indicators may represent key performance indicators for an entity referenced by an identified term with respect to the specific organization of the user 202. For each matching term identified in the user interface 250, the server 220 selects a subset of the available indicator or data types to provide in the results 224. This subset may be selected based on various factors. In some implementations, a predefined set of indicators is pre-associated with different semantic classifications. As a result, one set of indicators is provided for customers, another set of indicators is provided for employees, another set of indicators is provided for suppliers, and so on. One way that the server 220 may implement this is to have card templates defined for each semantic classification, where the card template indicates data types of indicators that are set to be provided for terms having that classification. Each indicator may have one or more references to data within the database, e.g., a column or field type of the private database 222 used to obtain or generate the indicator, as well as corresponding equations for generating the indicator and criteria such as threshold for evaluating the indicator.

In some implementations, at least some of the indicators are selected dynamically based on analysis of the contents of the private database 222. This process may be done to modify (e.g., filter and/or supplement) a base set of indicators pre-associated with a semantic classification or to generate the set of indicators directly. The indicators to be provided are selected from what is available or what may be calculated from the information in the private database 222 and optionally other data sources. From the available indicators, the server 220 may apply various thresholds to determine which indicators are most relevant. For example, if an indicator deviates from a historical average or range by more than a threshold amount, the indicator may be indicated selected. Similarly, if an indicator relates to a recent or upcoming event occurring within a threshold amount of time from the current time, the indicator may be selected. In general, each indicator may be assigned a score for each of multiple factors, the indicators may be ranked based on the scores, and the highest-scoring indicators may be selected to provide to the client device 210 in the results 224.

The indicators may also be customized based on the role of the user 202 in the organization. For example, the server 220 may look up a job title, department identifier, or other classification of the user 202, and also access data specifying indicators relevant to that classification. As an example, a user indicated in company records as a financial analysis may be provided financial metrics for a customer, while a user indicated as an engineer may be provided technical information about a product sold to the customer. The indicators selected may be further customized based on the historical interaction of the user 202. For example, based on records of interactions of the user 202 with prior information cards, the server 220 may determine which indicators are likely to be of interest to the user 202 for different types of entities.

The server 220 may use various other techniques to select indicators, including predefined indicators for specific classifications or specific entities, user interactions data for multiple users, user preferences of the user 202, prior behavior of the user 202, artificial intelligence or machine learning, analysis of trends, news and recent events, and so on.

In some implementations, the system tracks user interactions and learns from user behavior. For example, the system may monitor interactions with information cards and adapt the current information card or later-provided information cards in response. The system may track any of a variety of interaction parameters, such as how long an information card is displayed, how many times the information card is caused to be displayed, whether a user moves a cursor over a UI element (e.g., a mouseover), how long the cursor hovers over the UI element, whether a UI element is selected or copied to a clipboard, etc. Information cards may have interactive elements also, e.g., buttons, scrolling controls, drop-down lists, hyperlinks, sliders, dials, maps, embedded audio or video, and so on. These interactive elements may reveal additional indicators or allow a user to access additional content from the private database or other data sources. The system may track interactions with these interactive elements as well.

The system may customize the characteristics of information cards for users individually or based on aggregated information about interactions of multiple users. For example, according to the level of interaction that users have with indicators on the panels, the system may change which types of indicators are selected, as well as the prominence, arrangement, or number of indicators presented. If one user frequently hovers over, selects, or copies to a clipboard information from a certain type of indicator for entities of a certain classification, the system may generate future panels for that classification to show the indicator more prominently (e.g. larger or closer to the top of the panel) and/or to include additional related indicators (e.g., showing the indicator with greater precision, or showing trends in the indicator over time, or showing other indicators of the same data type). As another example, if a user rarely interacts with certain types of indicators, those indicators may be made less prominent (e.g., smaller or lower in the panel) or may be removed.

Tracking and adjustment of information cards may be done on a per-user basis, or for groups of users (e.g., users at similar roles or in the same department or organization), or across users generally. Similarly, tracking and adjustment may be done for certain classifications as a whole (e.g., across all entities or terms sharing a semantic classification), or tracking and adjustment may be done separately at the level of individual terms or entities. For example, two companies of the same semantic classification (e.g., both suppliers to an organization) may have different indicators shown in their information cards, or have a different arrangement of the indicators, due to different ways users interact with the respective panels.

In stage (K), the server 220 may provide the selected indicators in an information card for each identified term from the query to the client device 210.

In stage (L), the software agent 212 may cooperate with the application 214 to annotate the identified terms in the user interface 250. For example, the term 252 is annotated in FIG. 2B. This process may cause the annotated terms to become interactive. For example, the software agent 212 may register with the application 214 to receive notification of interaction events, such as a mouseover event, click event, tap event, etc.

In stage (M), the software agent 212 may detect interaction with one of the annotated terms. For example, the user 202 moves a cursor 254 over the annotated term 252.

In stage (N), the software agent 212 may cause the display of an information card 260, for example, as an overlay or pop-up over the original user interface 260. The information card may include the indicators selected by the server 220 and provided over the network in a populated card template. In some implementations, the information card 260 may be displayed near, e.g., adjacent to or even partially or completely overlapping the annotated term 252.

Figure 5A:
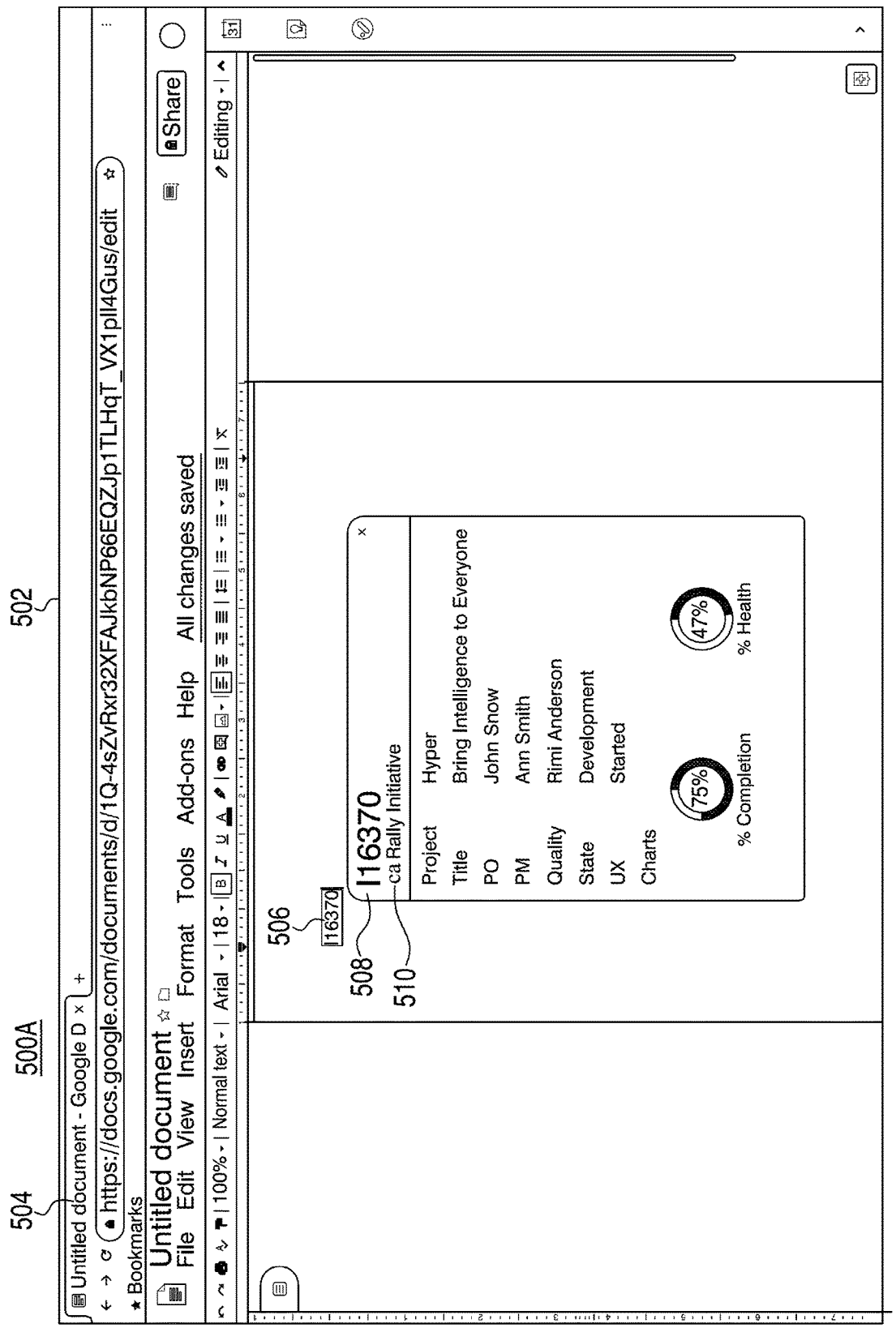

In one aspect of the disclosure, the information cards (e.g., information card 508 of FIG. 5A) may include a link (e.g., displayed as a link element 510 of FIG. 5A). Generally, the link may be a dynamic link or a static link, as defined in a card template. The link, when executed by a client device 110, may launch an application on the client device 110, or may launch a web page or web application (e.g., on the application 114) on the client device 110. Generally, the displaying of information cards that include a link may be referred to as a link display process. The link display process generally follows the examples discussed above with respect to FIGS. 1-2B, however the link display process also includes processes to generate an information card that includes the link, and processes to execute a link process to launch an application on the client device or launch a web page or web application (e.g., on the application 114) on the client device 110.

Figure 3:
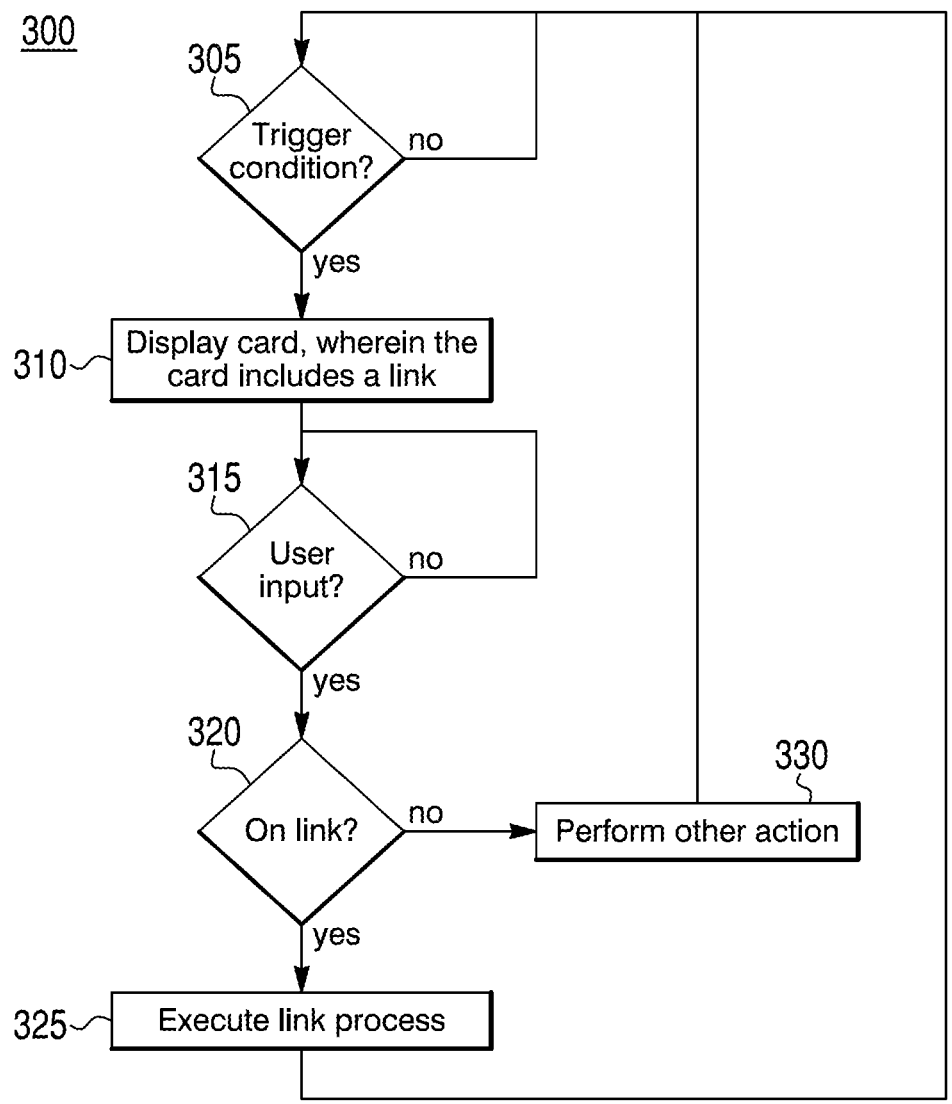
FIG. 3 depicts a flowchart for a link display process, according to one or more embodiments.

As an illustrative example, the client device 110 may execute a process of a flowchart 300 depicted in FIG. 3 to display an information card that includes a link. FIG. 3 depicts a flowchart for a link display process, according to one or more embodiments. The flowchart 300 may be performed by, e.g., the software agent 112 on the client device 110, as discussed above. The software agent 112 may start the process of the flowchart 300 by determining whether a trigger condition is present (block 305). For instance, the software agent 112 may monitor activity on the client device 110 to detect satisfaction of a trigger condition that specifies display of an information card on the client device 110, as discussed above in FIGS. 1-2B. For instance, the software agent 112 may detect a matching tem, such as a term of the set of terms 116, in the text of the user interface 150.

In response to determining that the trigger condition is not present (block 305: No), the software agent 112 may proceed to wait until the trigger condition is present (block 305). In response to determining that the trigger condition is present (block 305: Yes), the software agent 112 may proceed to display an information card (block 310).

For instance, the software agent 112 may generate and transmit the query 118 to the server 120, as discussed above in FIGS. 1-2B. In response to receiving the query 118, the server 120 may access the private database 122 and generate one or more information cards that are to be provided to the client device 110 in response to the query 118, as discussed above in FIGS. 1-2B. The server 120 may transmit the one or more information cards for presentation on the client device 110. In response to receiving the one or more information cards from the server 120, the client device 110 may present the one or more information cards for display on a user interface 150, as discussed above in FIGS. 1-2B.

Generally, the server 120 may select a card template from among the card templates, based on the term(s) identified as corresponding to an entity, or an indication of the entity determined to be relevant to the current context identifier for the user 102 and/or the client device 110, and/or an identifier for the user 102 and/or the client device 110. The server 120 may then access the private database 122 to retrieve data, in accordance with the selected card template. The server 120 may then populate an information card with the retrieved data to generate the information card.

Generally, the card templates may or may not include a link, set by an author of the card template. The card templates may or may not include a link based on identifier for the user 101, so that users of different classifications with different levels of access to information about an entity or different roles within an organization may or may not have a link in an information card generated based on the card template. For instance, a first user with a higher access level than a second user may receive an information card that includes a link to a data application that contains secured information, while the second user may not receive an information card that includes the link to the data application. Meanwhile, a third user (e.g., the second user or someone else) may have a maintenance-related role within the organization and the third user may receive an information card that includes a link to a maintenance application.

In the case that the selected card template is set to include a link, the server 120 may obtain link information for the selected card template. The link information may be stored in the card template or in association thereto. The link information may include display information on how a link may be displayed. The display information may indicate format and structure of the link on the card, such as location and orientation of graphic(s), if any, for the link and/or text, if any, for the link. The display information may be set by the author, as discussed below with respect to FIGS. 4A-4E. The link information may also include address information. The address information may include a text string that, when executed by a client device, launches an application on the client device or launches a web page or web application (e.g., on the application 114) on the client device. For instance, the web page may be the intended end point of the address information, or the web page may be a redirect point to launch the application. In the case that the web page is a redirect point, the application 114/client device 110 may then redirect to the application, in accordance with, e.g., deep linking. The address information may be set by the author, as discussed below with respect to FIGS. 4A-4E.

Figure 4A:
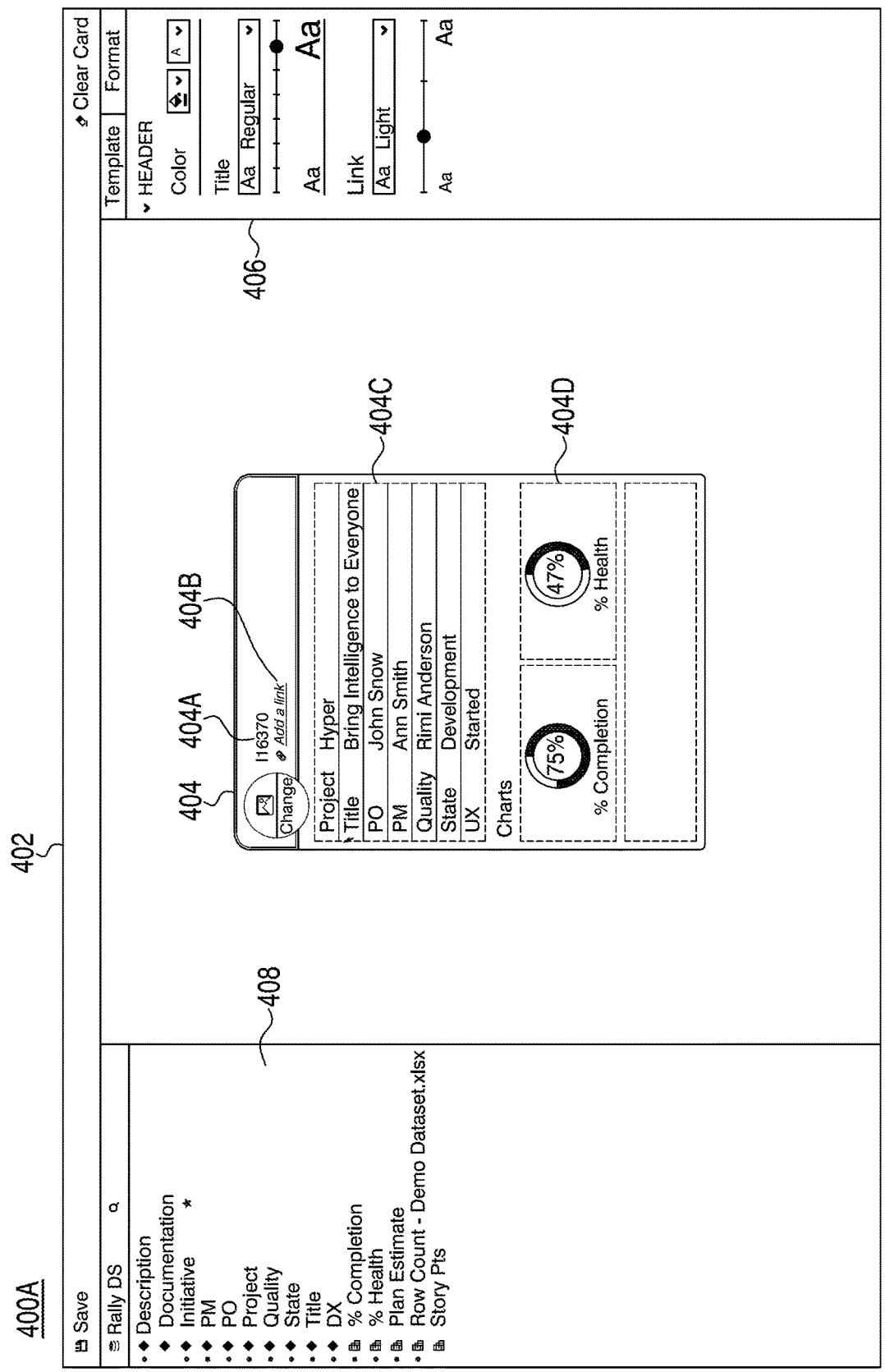
Figure 4B:
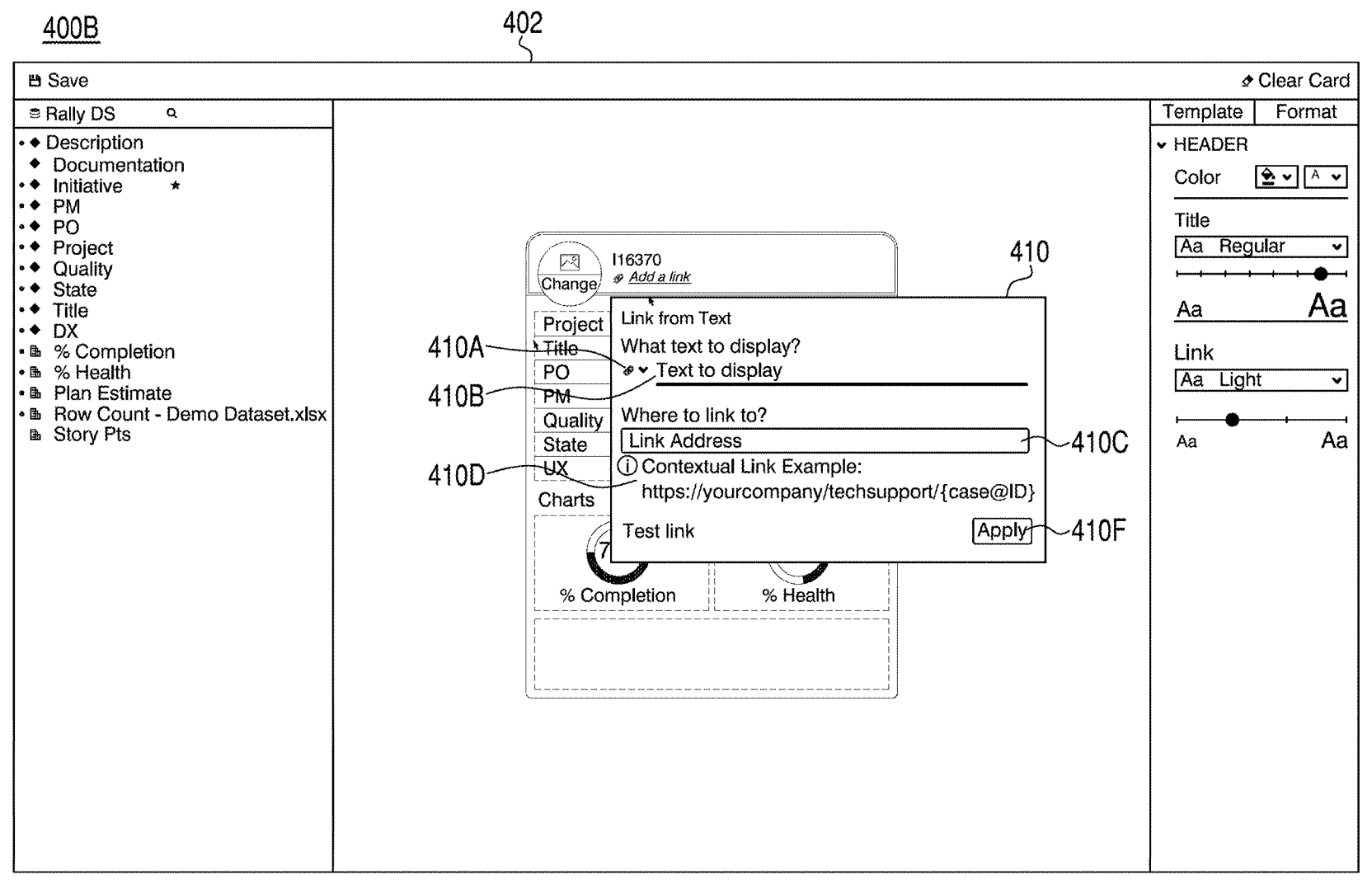
Figure 4C:
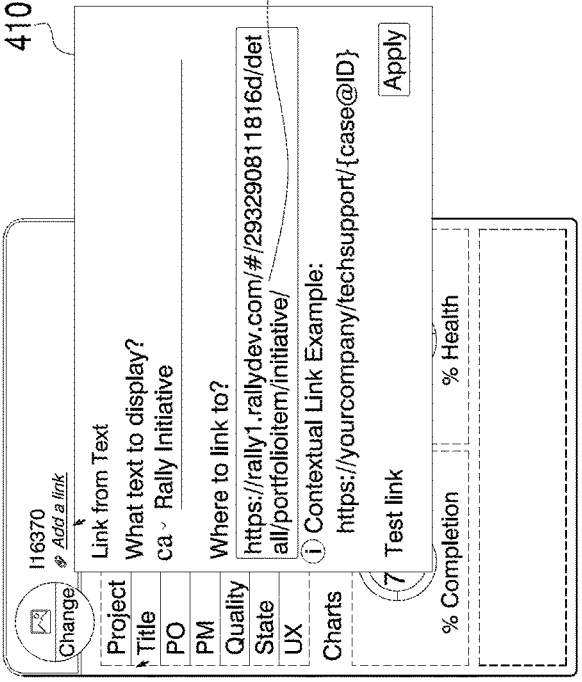
Figure 4D:
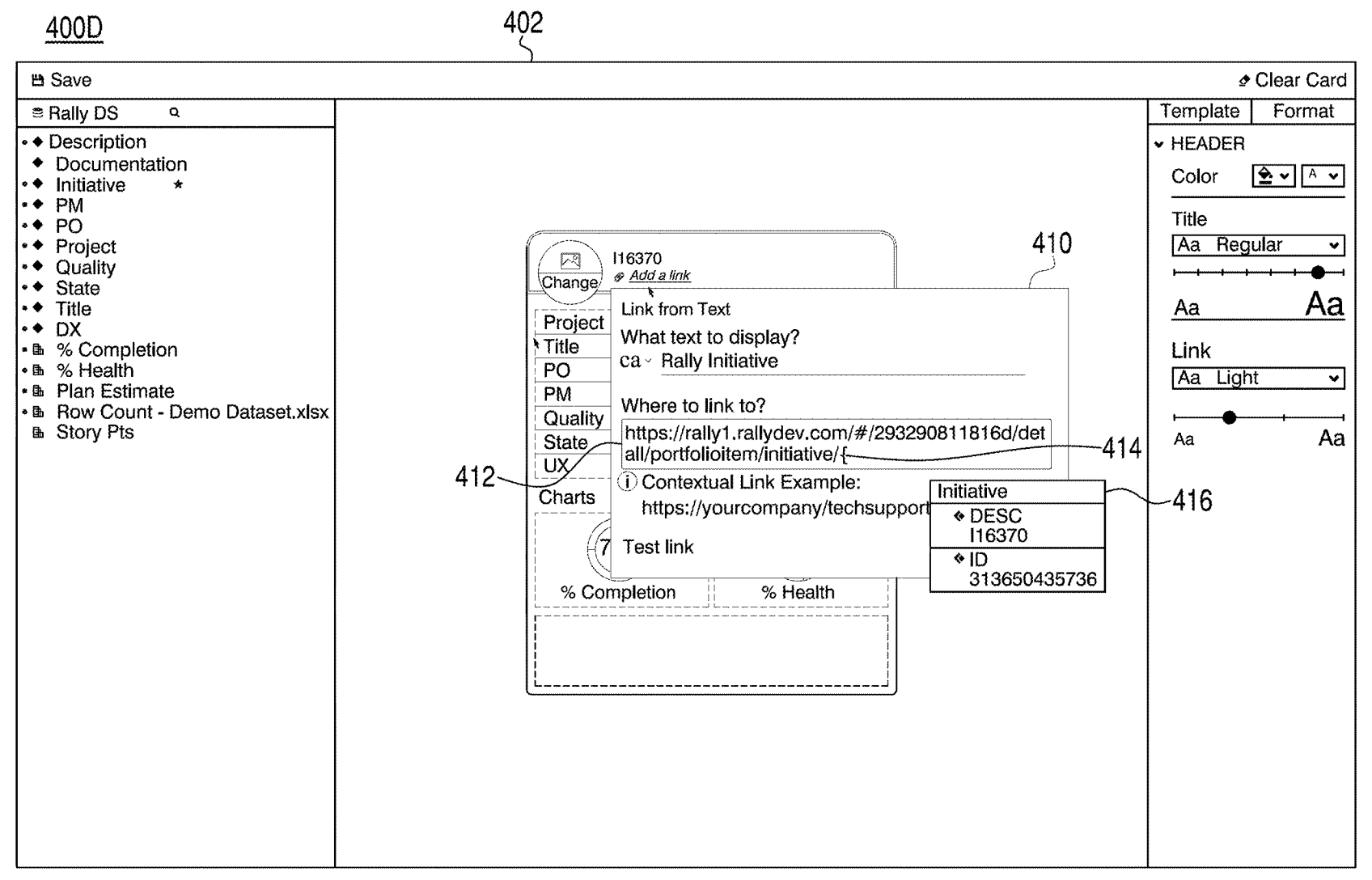
Figure 4E:
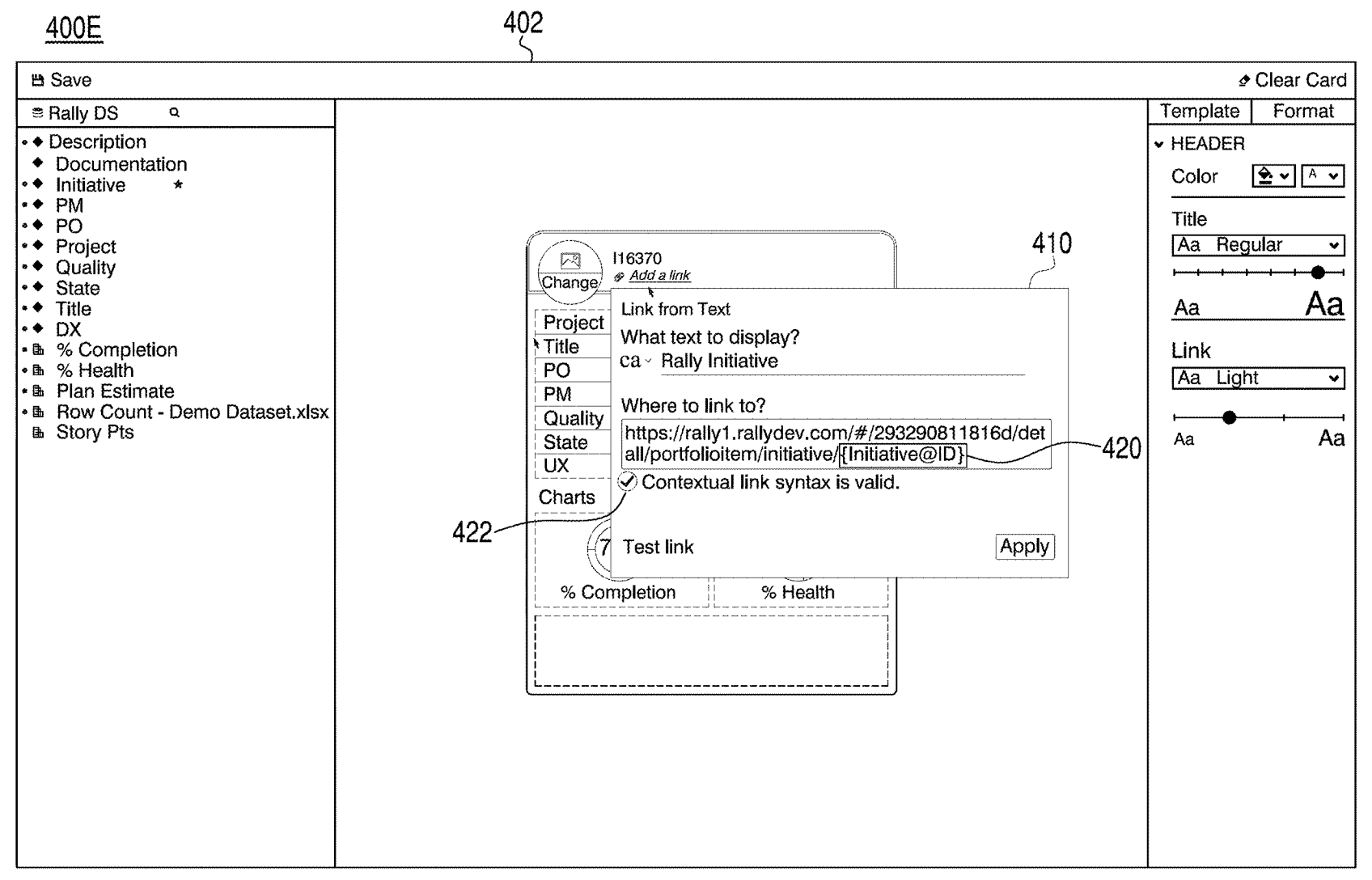

For a dynamic link, the text string of the address information may include a base portion and/or a one or more parameter portion(s) (such as base portion 412 and parameter portion 420 of FIGS. 4C and 4E). The base portion may be static (i.e., remains the same), while the parameter portion(s) may be dynamic, so that the server 120 may retrieve one or more data element(s) (e.g., an identifier, a key parameter, etc.) from the private database 122 in accordance with data element pointer(s), and populate the parameter portion(s) to complete the text string, when the server 120 is generating an information card that includes a dynamic link. For a static link, the text string of the address information may be comprised entirely of a base portion. In the case that the text string includes only parameter portion(s), the server 120 may retrieve the one or more data element(s) (e.g., an identifier, a key parameter, etc.) from the private database 122 in accordance with data element pointer(s), and populate the parameter portion(s) to complete the text string (without any base portion), when the server 120 is generating an information card that includes a dynamic link.

The client device 110 may display the one or more information cards and, for the one or more information cards that include link information, the client device 110 may display a link element, in accordance with the link information, in the one or more information cards that include link information. The link element may be selectable by a user input to execute a link process.

Returning to FIG. 3, the software agent 112 may then proceed to determine whether a user input is received (block 315). In response to determining that the user input is not received (block 315: No), the software agent 112 may proceed to wait until the user input is received (block 315). In response to determining that the user input is received (block 315: Yes), the software agent 112 may proceed to determine whether the user input is on the link element of the information card (block 320). For instance, the software agent 112 may determine that a user input (e.g., a touch input, a click, etc.) selects the link element of a displayed information card. One of skill in the art would recognize that the selection of link element may also be in various other forms, such as a voice input selecting the link element, so the user input may not necessarily be on the link element but may select the link element in a different manner.

In response to determining that the user input is not on the link element of the information card (block 320: No), the software agent 112 may perform another action that corresponds to the user input (block 330). For instance, the software agent 112 may close the information card, display additional information of the information card, etc., in accordance with the user input on other card elements being displayed. The software agent 112 may then proceed to determine whether a trigger condition is present (block 305).

In response to determining that the user input is on the link element of the information card (block 320: Yes), the software agent 112 may proceed to execute a link process (block 325). For instance, the software agent 112 may obtain the link information associated with the link element, extract the address information from the link information, and execute a link launch process using the address information.

The link launch process may launch an application on the client device or launch a web page or web application (e.g., on the application 114) on the client device, in accordance with the address information. Generally, in the case of a static link, the link launch process may: (1) open an already installed application on the client device (e.g., main menu of the application), (2) open a web page or web application in the application 114, and/or (3) open a download application/web page to download the application, with or without opening the application after the application has been downloaded. In the case of a dynamic link, the link launch process may: (1) open an application to a particular feature of the application, corresponding to the data element of the parameter portion of the address information, (2) open a web page or web application in the application 114 to a particular resource, corresponding to the data element of the parameter portion of the address information, (3) open a download application/web page to download the application, with or without opening the application after the application has been downloaded to the particular feature of the application, and/or (4) open a web page, a web page of a search engine, and/or web application in the in the application 114, and/or open a search engine application, and execute a search using the data element of the parameter portion of the address information. For instance, the link launch process may execute the text string of the address information as an uniform resource locator (URL) in the application 114 to access the web page or web application, or the link launch process may execute the text string of the address information as a file path to open the application on the client device 110. The application may interpret the parameter portion of the text string (e.g., in accordance with an application programing interface) to open the particular feature/particular resource. The particular feature/particular resource may correspond to the entity of the information card. As an illustrative example, in the case of a machine as an entity, the information card may display relevant information for the entity, and the link element of the information card may be a link to the machine within a maintenance application.

Returning to FIG. 3, the software agent 112 may then proceed to determine whether a trigger condition is present (block 305).

As a result, a user of the software agent 112 of the present disclosure may access relevant information and/or applications that are contextually relevant without additional navigation. For instance, a user may avoid searching for the information or searching for a relevant application/web page to open and navigate therein. Instead, the software agent 112 of the present disclosure may provide a link directly to the information (e.g., on a web page or web application) or to an application (in general, or to a particular portion). In the case of the particular portion of the application, the user may only select the link element to be brought to a contextually relevant aspect of the application, such as a particular user interface of an application that may be associated with an entity that triggered the information card to be displayed. Therefore, the user may avoid searching within applications to find the particular portion of the application that is associated with the entity.

Generally, the applications/web pages/web applications the links launch may correspond to: publicly available applications, publicly available web pages/search engines, publicly available web applications, proprietary applications, such as enterprise applications, proprietary web pages, and/or proprietary web applications (e.g., within an enterprise network that is not publicly accessible). For instance, as illustrative examples in a non-exhaustive manner, the applications (or web pages/web applications) may correspond to: data analytics applications, sales applications, maintenance applications, supply chain applications, store applications, client applications, human resource applications, etc.

FIGS. 4A-4E depict exemplary graphical user interfaces (GUIs) for authoring an information card that includes at least one link for a link display process, according to one or more embodiments. In FIG. 4A, GUI 400A may depict an authoring interface 402 of authoring application. The authoring interface 402 may allow a user of the authoring application to generate card templates. The authoring application may be executed on a client device, such as client device 110. The authoring interface 402 may allow an author (e.g., a user of the authoring application) to select/generate a template 404 for a card template, using formatting tools 406 and data set links 408 to populate data element pointers to specific data elements of information in the private database 122. For instance, template 404 may have a header 404A, and one or more data portions 404C/404D. The one or more data portions 404C/404D may be configured using the formatting tools 406 and may contain static information (e.g., entered by the user) and dynamic data, set by the data element pointers using the data set links 408, as set by the author. The header 404A may include text or images, as set by the author, and an link add element 404B to include a link element for the template 404. When a link element is included in the template 404, the template 404 (when deployed to users of the software agent 112/server 120) may perform as discussed above.

In FIG. 4B, GUI 400B may depict a link add menu 410 in response to a user input on the link add element 404B. The link add menu 410 may include a graphic element 410A, a display text element 410B, a link address input field 410C, an example link 410D, a test element 410E, and/or an apply element 410F. The graphic element 410A may be selectable by the author to include a graphic element for the link element, as a part of the display information. The graphic element may be selected from among standard graphics or based on author graphics provided to the authoring application. The display text element 410B may be selectable by the author to input text for displaying in the link element, as a part of the display information. The link address input field 410C may be selectable by the author to input text for the text string of the address information. The example link 410D may a text string that has valid syntax to execute as a link (e.g., dynamically or statically). The test element 410E may be selectable by the author to test a current text string in the link address input field 410C, for instance the authoring application may apply syntax rules to the current text string to determine whether the current text string has valid syntax or not. The apply element 410F may be selectable by the author to save the configured link element as a part of the template 404. The apply element 410F may be selectable only if the current text string in the link address input field 410C has valid syntax.

In FIG. 4C, GUI 400C may depict current text string in the link address input field 410C in response to a user input inputting the current text string (e.g., typing or copy and paste, etc.) into the link address input field 410C. In this case, the current text string may be a base portion 412. Using on the syntax rules, the authoring application may dynamically determine whether the current text string in the link address input field 410C (as it changes) has valid syntax and whether the current text string is forming a static or dynamic link.

In FIG. 4D, GUI 400D may depict a trigger text element 414 that indicates the author is forming a dynamic link. For instance, the trigger text element may be a first text (or portion of) a parameter portion. The authoring application may determine whether the trigger text element 414 is present (e.g., by matching defined text using regular expression processing to the current text string in the link address input field 410C). In response to determining the trigger text element 414 is present, the authoring application may display a parameter menu 416 for likely parameter portions. The parameter menu 416 may include one or more data element pointers of the data set links 408 based on context. For instance, the authoring application may determine the current text string has a word/term/URL that could have a parameter portion that corresponds to one of the data element pointers, and suggest the one of the data element pointers. The one or more data element pointers of the parameter menu 416 may be selectable by the author to auto-complete the current text string.

In FIG. 4E, GUI 400E may depict an auto-completed current string with the parameter portion 420 automatically entered by the authoring application, in response to a user input selecting one of the one or more data element pointers of the parameter menu 416. Moreover, the authoring application may display a syntax valid indicator 422, if the authoring application, using the syntax rules, determines the current text string has valid syntax. For instance, the syntax valid indicator 422 may replace the example link 410D. The author may select the apply element 410F to save the configured link element.

The author may save the template 404, with the saved configured link element. The author may make the template 404 available to the server 120 and/or the client device, such as client device 110, to allow the template 404 to be used as a card template among the card templates 124 for use in association with one or more entities. As the link element of the template 404 may be dynamic, the link element for the one or more entities may be dynamically generated when an information card is generated for an entity, by accessing a data element pointer for that entity.

Figure 5B:
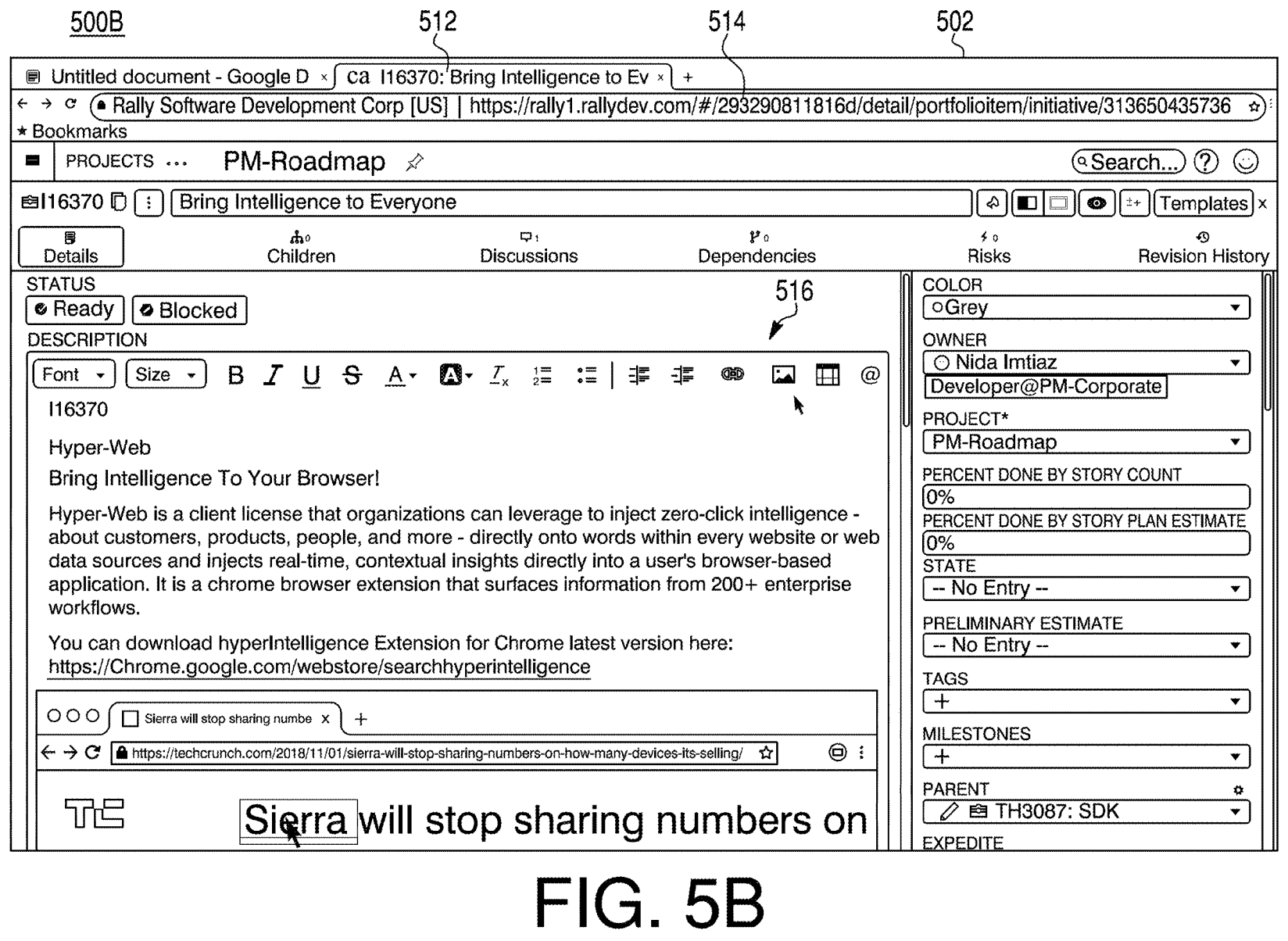

FIGS. 5A-5B depict graphical user interfaces (GUIs) for displaying an information card that includes a link for a link display process, according to one or more embodiments. In FIG. 5A, GUI 500A may depict an application interface 502 for an application (e.g., the application 114) on a client device, such as the client device 110. The software agent 112 of the client device 110 may determine that within the window 504 of the application interface 502 a term 506 satisfies a trigger condition (e.g., matches a term of the set of terms 116), and executes the link display process, as discussed above. For instance, the software agent 114 may generate and transmit the query 118 to the server 120, and in response to receiving an information card 508 that corresponds to the term 506, the software agent 112 may display the information card 508. The information card 508 may include a link element 510. The link element 510 may correspond to the link element saved in in the authoring process described above.

In FIG. 5B, GUI 500B may depict a linked window 512, in response to a user input selecting the link element 510 of the GUI 500A, in accordance with the link display process. The linked window 512 may have an address 514 that corresponds to the base portion 412 and the parameter portion 420, as dynamically generated for the information card 508. In this example, the linked window 512 is a web page in a mobile browser that is for a particular resource that corresponds to the parameter portion 420, as dynamically generated for the information card 508. In the linked window 512, relevant information 516 may be displayed for the particular resource.

In another aspect of the disclosure, the link element might not be included in the header of an information card. Instead, or additionally, the link element may be in the one or more data portions 404C/404D of an information card. In this case, the displayed information in the one or more data portions 404C/404D may include static or dynamic data from the private database 122, and/or a link element. The displayed information/link element may be selectable by a user in a similar manner as to the static or dynamic links above in the link display process. The address information for this link element may be retrieved by the server 120 from the private database 122 as a data element.

Figure 6:
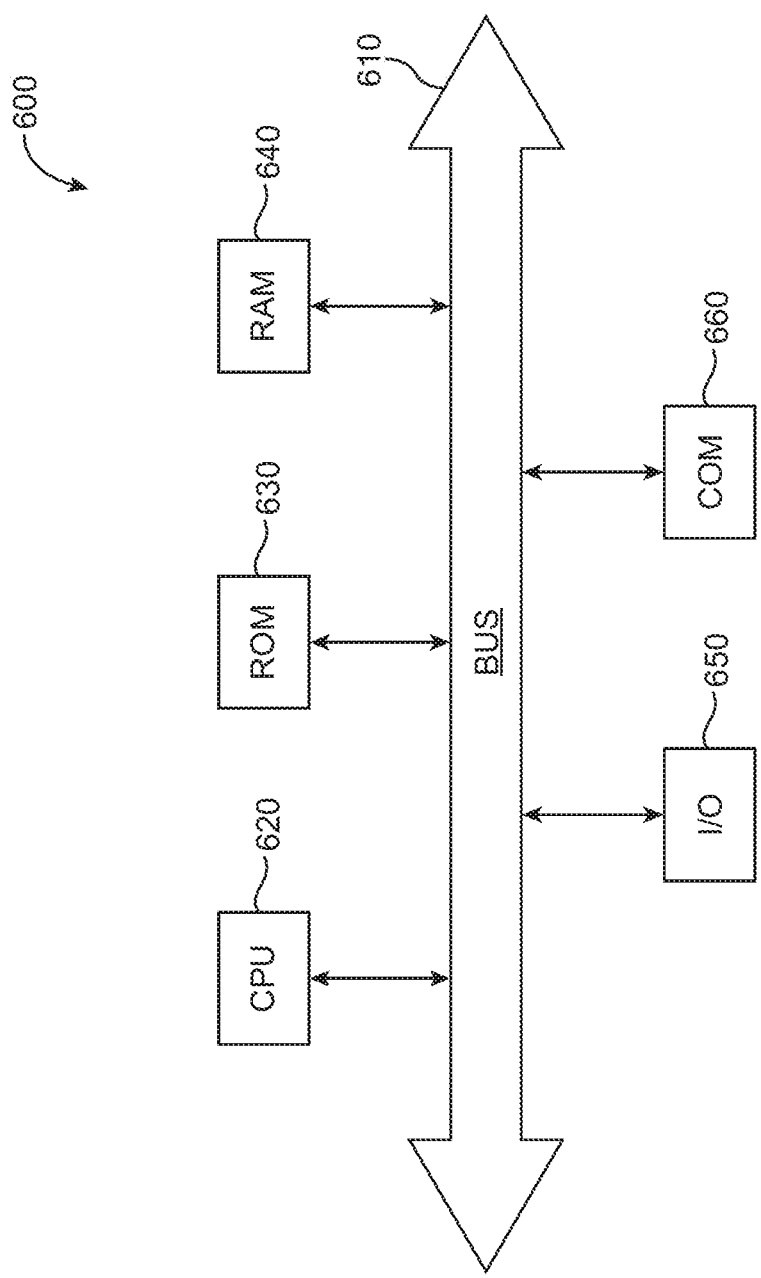
FIG. 6 depicts an example system that may execute techniques presented herein.

FIG. 6 depicts an example system that may execute techniques presented herein. FIG. 6 is a simplified functional block diagram of a computer that may be configured to execute techniques described herein, according to exemplary embodiments of the present disclosure. Specifically, the computer (or "platform" as it may not a be a single physical computer infrastructure) may include a data communication interface 660 for packet data communication. The platform may also include a central processing unit ("CPU") 620, in the form of one or more processors, for executing program instructions. The platform may include an internal communication bus 610, and the platform may also include a program storage and/or a data storage for various data files to be processed and/or communicated by the platform such as ROM 630 and RAM 640, although the system 600 may receive programming and data via network communications. The system 600 also may include input and output ports 650 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure may be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for displaying contextually relevant links by a browser extension, comprising:
    receiving and examining content of a user interface of a browser, on a client device, on a recurring or ongoing basis;
    comparing terms of a set of terms at a system database with terms in the content of the user interface to identify matching terms;
    identifying a contextual term within the content of the user interface of the browser, the contextual term being different than the matching term;
    identifying a semantic meaning of the contextual term based on at least one of the matching terms, the semantic meaning based on a semantic classification;
    in response to identifying matching terms and the semantic meaning of the contextual term, transmitting a query to a server, the query comprising the matching terms and the semantic meaning of the contextual term;
    receiving a response from the server, the response including one or more information cards for each of the matching terms, the one or more information cards including information based on the semantic meaning of the contextual term;
    annotating instances of the identified matching terms on the user interface;
    in response to a user interaction with an annotated instance of an identified matching term, causing an information card to be displayed that corresponds to the identified matching term, the information card including a link element;
    determining whether a user input selects the link element; and
    in response to determining the user input selecting the link element, executing a link process.

2. The method of claim 1, wherein the executing the link process includes:
    obtaining link information from the information card;
    extracting address information from the link information; and
    executing a link launch process to launch a web page or a web application on the browser, in accordance with the address information.

3. The method of claim 1,
    wherein the executing the link process includes:
        obtaining link information from the information card;
        extracting address information from the link information; and
        executing a link launch process to launch a web page or a web application on the browser, in accordance with the address information,
    wherein the executing the link launch process comprises:
        extracting a text string from the address information; and
        executing the text string as a uniform resource locator (URL) in the browser of the client device to access the web page or the web application corresponding to the URL.

4. The method of claim 1,
    wherein the executing the link process includes:
        obtaining link information from the information card;
        extracting address information from the link information; and
        executing a link launch process to launch a web page or a web application on the browser, in accordance with the address information,
    wherein the executing the link launch process comprises:
        extracting a text string from the address information; and
        executing the text string as a uniform resource locator (URL) in the browser of the client device to access the web page or the web application corresponding to the URL,
    wherein the address information comprises a static or a dynamic link.

5. The method of claim 1,
    wherein the executing the link process includes:
        obtaining link information from the information card;
        extracting address information from the link information; and
        executing a link launch process to launch a web page or a web application on the browser, in accordance with the address information,
    wherein the executing the link launch process comprises:
        extracting a text string from the address information; and
        executing the text string as a uniform resource locator (URL) in the browser of the client device to access the web page or the web application corresponding to the URL,
    wherein the address information comprises a static or a dynamic link,
    wherein the text string of the address information includes a base portion of the text string and/or one or more data elements of parameter portions of the text string.

6. The method of claim 1,
wherein the executing the link process includes:
   obtaining link information from the information card;
   extracting address information from the link information; and
   executing a link launch process to launch a web page or a web application on the browser, in accordance with the address information,
wherein the executing the link launch process comprises:
   extracting a text string from the address information; and
   executing the text string as a uniform resource locator (URL) in the browser of the client device to access the web page or the web application corresponding to the URL,
wherein the address information comprises a static or a dynamic link,
wherein the text string of the address information includes a base portion of the text string and/or one or more data elements of parameter portions of the text string,
wherein the server generates the information card by:
   selecting a template for the information card from among a plurality of templates that each specify a different content and format for the information card; and
   generating the information card by populating the selected template with stored data from a database.

7. The method of claim 1,
wherein the executing the link process includes:
   obtaining link information from the information card;
   extracting address information from the link information; and
   executing a link launch process to launch a web page or a web application on the browser, in accordance with the address information,
wherein the executing the link launch process comprises:
   extracting a text string from the address information; and
   executing the text string as a uniform resource locator (URL) in the browser of the client device to access the web page or the web application corresponding to the URL,
wherein the address information comprises a static or a dynamic link,
wherein the text string of the address information includes a base portion of the text string and/or one or more data elements of parameter portions of the text string,
wherein the server generates the information card by:
   selecting a template for the information card from among a plurality of templates that each specify a different content and format for the information card; and
   generating the information card by populating the selected template with stored data from a database,
wherein the server generates the address information for the information card by:
   retrieving the one or more data elements for the parameter portions from the database in accordance with one or more data element pointers, and
   populating the one or more parameter portions to complete the text string.

8. A system for displaying contextually relevant links by a browser extension, the system comprising:
   at least one memory storing instructions; and
   at least one processor executing the instructions to perform operations, the operations including:
      receiving and examining content of a user interface of a browser, on a client device, on a recurring or ongoing basis;
      comparing terms of a set of terms at a system database with terms in the content of the user interface to identify matching terms;
      identifying a contextual term within the content of the user interface of the browser, the contextual term being different than the matching term;
      identifying a semantic meaning of the contextual term based on at least one of the matching terms, the semantic meaning based on a semantic classification;
      in response to identifying matching terms and the semantic meaning of the contextual term, transmitting a query to a server, the query comprising the matching terms and the semantic meaning of the contextual term;
      receiving a response from the server, the response including one or more information cards for each of the matching terms, the one or more information cards including information based on the semantic meaning of the contextual term;
      annotating instances of the identified matching terms on the user interface;
      in response to a user interaction with an annotated instance of an identified matching term, causing an information card to be displayed that corresponds to the identified matching term, the information card including a link element;
      determining whether a user input selects the link element; and
      in response to determining the user input selecting the link element, executing a link process.

9. The system of claim 8, wherein the executing the link process includes:
   obtaining link information from the information card;
   extracting address information from the link information; and
   executing a link launch process to launch a web page or a web application on the browser, in accordance with the address information.

10. The system of claim 8,
wherein the executing the link process includes:
   obtaining link information from the information card;
   extracting address information from the link information; and
   executing a link launch process to launch a web page or a web application on the browser, in accordance with the address information,
wherein the executing the link launch process comprises:
   extracting a text string from the address information; and
   executing the text string as a uniform resource locator (URL) in the browser of the client device to access the web page or the web application corresponding to the URL.

11. The system of claim 8,
wherein the executing the link process includes:
   obtaining link information from the information card;
   extracting address information from the link information; and
   executing a link launch process to launch a web page or a web application on the browser, in accordance with the address information,
wherein the executing the link launch process comprises:
   extracting a text string from the address information; and executing the text string as a uniform resource locator (URL) in the browser of the client device to access the web page or the web application corresponding to the URL,
wherein the address information comprises a static or a dynamic link.

12. The system of claim 8,
wherein the executing the link process includes:
obtaining link information from the information card;
extracting address information from the link information; and
executing a link launch process to launch a web page or a web application on the browser, in accordance with the address information,
wherein the executing the link launch process comprises:
extracting a text string from the address information; and
executing the text string as a uniform resource locator (URL) in the browser of the client device to access the web page or the web application corresponding to the URL,
wherein the address information comprises a static or a dynamic link,
wherein the text string of the address information includes a base portion of the text string and/or one or more data elements of parameter portions of the text string.

13. The system of claim 8,
wherein the executing the link process includes:
obtaining link information from the information card;
extracting address information from the link information; and
executing a link launch process to launch a web page or a web application on the browser, in accordance with the address information,
wherein the executing the link launch process comprises:
extracting a text string from the address information; and
executing the text string as a uniform resource locator (URL) in the browser of the client device to access the web page or the web application corresponding to the URL,
wherein the address information comprises a static or a dynamic link,
wherein the text string of the address information includes a base portion of the text string and/or one or more data elements of parameter portions of the text string,
wherein the server generates the information card by:
selecting a template for the information card from among a plurality of templates that each specify a different content and format for the information card; and
generating the information card by populating the selected template with stored data from a database.

14. The system of claim 8,
wherein the executing the link process includes:
obtaining link information from the information card;
extracting address information from the link information; and
executing a link launch process to launch a web page or a web application on the browser, in accordance with the address information,
wherein the executing the link launch process comprises:
extracting a text string from the address information; and
executing the text string as a uniform resource locator (URL) in the browser of the client device to access the web page or the web application corresponding to the URL,
wherein the address information comprises a static or a dynamic link,
wherein the text string of the address information includes a base portion of the text string and/or one or more data elements of parameter portions of the text string,
wherein the server generates the information card by:
selecting a template for the information card from among a plurality of templates that each specify a different content and format for the information card; and
generating the information card by populating the selected template with stored data from a database,
wherein the server generates the address information for the information card by:
retrieving the one or more data elements for the parameter portions from the database in accordance with one or more data element pointers, and
populating the one or more parameter portions to complete the text string.

15. A non-transitory computer-readable medium storing instructions that, when executed by a processor, cause the processor to perform operations for displaying contextually relevant links by a browser extension, the operations comprising:
receiving and examining content of a user interface of a browser, on a client device, on a recurring or ongoing basis;
comparing terms of a set of terms at a system database with terms in the content of the user interface to identify matching terms;
identifying a contextual term within the content of the user interface of the browser, the contextual term being different than the matching term;
identifying a semantic meaning of the contextual term based on at least one of the matching terms, the semantic meaning based on a semantic classification;
in response to identifying matching terms and the semantic meaning of the contextual term, transmitting a query to a server, the query comprising the matching terms and the semantic meaning of the contextual term;
receiving a response from the server, the response including one or more information cards for each of the matching terms, the one or more information cards including information based on the semantic meaning of the contextual term;
annotating instances of the identified matching terms on the user interface;
in response to a user interaction with an annotated instance of an identified matching term, causing an information card to be displayed that corresponds to the identified matching term, the information card including a link element;
determining whether a user input selects the link element; and
in response to determining the user input selecting the link element, executing a link process.

16. The non-transitory computer-readable medium of claim 15, wherein the executing the link process includes:
obtaining link information from the information card;
extracting address information from the link information; and executing a link launch process to launch a web page or a web application on the browser, in accordance with the address information.

17. The non-transitory computer-readable medium of claim 15,
wherein the executing the link process includes:
obtaining link information from the information card;
extracting address information from the link information; and
executing a link launch process to launch a web page or a web application on the browser, in accordance with the address information,
wherein the executing the link launch process comprises:
extracting a text string from the address information; and
executing the text string as a uniform resource locator (URL) in the browser of the client device to access the web page or the web application corresponding to the URL.

18. The non-transitory computer-readable medium of claim 15,
wherein the executing the link process includes:
obtaining link information from the information card;
extracting address information from the link information; and
executing a link launch process to launch a web page or a web application on the browser, in accordance with the address information,
wherein the executing the link launch process comprises:
extracting a text string from the address information; and
executing the text string as a uniform resource locator (URL) in the browser of the client device to access the web page or the web application corresponding to the URL,
wherein the text string of the address information includes a base portion of the text string and/or one or more data elements of parameter portions of the text string.

19. The non-transitory computer-readable medium of claim 15,
wherein the executing the link process includes:
obtaining link information from the information card;
extracting address information from the link information; and
executing a link launch process to launch a web page or a web application on the browser, in accordance with the address information,
wherein the executing the link launch process comprises:
extracting a text string from the address information; and
executing the text string as a uniform resource locator (URL) in the browser of the client device to access the web page or the web application corresponding to the URL,
wherein the text string of the address information includes a base portion of the text string and/or one or more data elements of parameter portions of the text string,
wherein the server generates the information card by:
selecting a template for the information card from among a plurality of templates that each specify a different content and format for the information card; and
generating the information card by populating the selected template with stored data from a database.

20. The non-transitory computer-readable medium of claim 15,
wherein the executing the link process includes:
obtaining link information from the information card;
extracting address information from the link information; and
executing a link launch process to launch a web page or a web application on the browser, in accordance with the address information,
wherein the executing the link launch process comprises:
extracting a text string from the address information; and
executing the text string as a uniform resource locator (URL) in the browser of the client device to access the web page or the web application corresponding to the URL,
wherein the text string of the address information includes a base portion of the text string and/or one or more data elements of parameter portions of the text string,
wherein the server generates the information card by:
selecting a template for the information card from among a plurality of templates that each specify a different content and format for the information card; and
generating the information card by populating the selected template with stored data from a database,
wherein the server generates the address information for the information card by:
retrieving the one or more data elements for the parameter portions from the database in accordance with one or more data element pointers, and
populating the one or more parameter portions to complete the text string.

21. The method of claim 1, further comprising:
monitoring a user interaction with the one or more information cards; and
adapting at least one of the one or more information cards based on monitoring the user interaction with the one or more information cards.

* * * * *